(12) United States Patent
Biermann et al.

(10) Patent No.: US 11,269,617 B2
(45) Date of Patent: Mar. 8, 2022

(54) SYSTEM FOR TRANSMITTING AT LEAST ONE UPGRADE PACKAGE FOR AT LEAST ONE CONTROL DEVICE OF A MOTOR VEHICLE AND METHOD

(71) Applicant: DAIMLER AG, Stuttgart (DE)

(72) Inventors: Sven Biermann, Mundelsheim (DE); Volker Feil, Leonberg (DE); Markus Folk, Remseck (DE); Denis Goldis, Esslingen am Neckar (DE); Jörg Harr, Nagold (DE); Daniel Hoffmann, Herrenberg (DE); Marcus Hohloch, Stuttgart (DE); Peter Höhmann, Sindelfingen (DE); Tobias Neumeier, Bietigheim-Bissingen (DE); Lifang Pilarski, Gechingen (DE); Stefan Sperlich, Stuttgart (DE); Sebastian Widmaier, Empfingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/971,471

(22) PCT Filed: Feb. 11, 2019

(86) PCT No.: PCT/EP2019/053275
§ 371 (c)(1),
(2) Date: Aug. 20, 2020

(87) PCT Pub. No.: WO2019/162122
PCT Pub. Date: Aug. 29, 2019

(65) Prior Publication Data
US 2020/0401395 A1  Dec. 24, 2020

(30) Foreign Application Priority Data
Feb. 21, 2018 (DE) .................. 10 2018 001 347.3

(51) Int. Cl.
*G06F 9/445* (2018.01)
*G06F 8/65* (2018.01)
(Continued)

(52) U.S. Cl.
CPC ............ *G06F 8/65* (2013.01); *B60W 50/06* (2013.01); *H04L 67/34* (2013.01)

(58) Field of Classification Search
CPC .......... G06F 8/65; B60W 50/06; H04L 67/34
(Continued)

(56) References Cited

U.S. PATENT DOCUMENTS

| 10,042,635 B2 | 8/2018 | Moeller et al. | |
| 10,165,084 B2 | 12/2018 | Moeller et al. | |
| 2020/0125355 A1* | 4/2020 | Aust | ............ H04W 12/08 |

FOREIGN PATENT DOCUMENTS

| DE | 102016210672 A1 | 12/2016 |
| DE | 102016210674 A1 | 12/2016 |

OTHER PUBLICATIONS

International Search Report dated May 23, 2019 in related/corresponding International Application No. PCT/EP2019/053275.
(Continued)

*Primary Examiner* — Chuck O Kendall
(74) *Attorney, Agent, or Firm* — Patent Portfolio Builders PLLC

(57) ABSTRACT

A system for transmitting at least one upgrade package for at least one control device of a motor vehicle is provided. The system includes a storage device external to the motor vehicle that stores the upgrade package, as well as a communication device that wirelessly transmits the upgrade package from the storage device external to the motor vehicle to at least one transmission device of the system. The transmission device conducts a transmission process of the upgrade package for the at least one control device and
(Continued)

Figure 1:
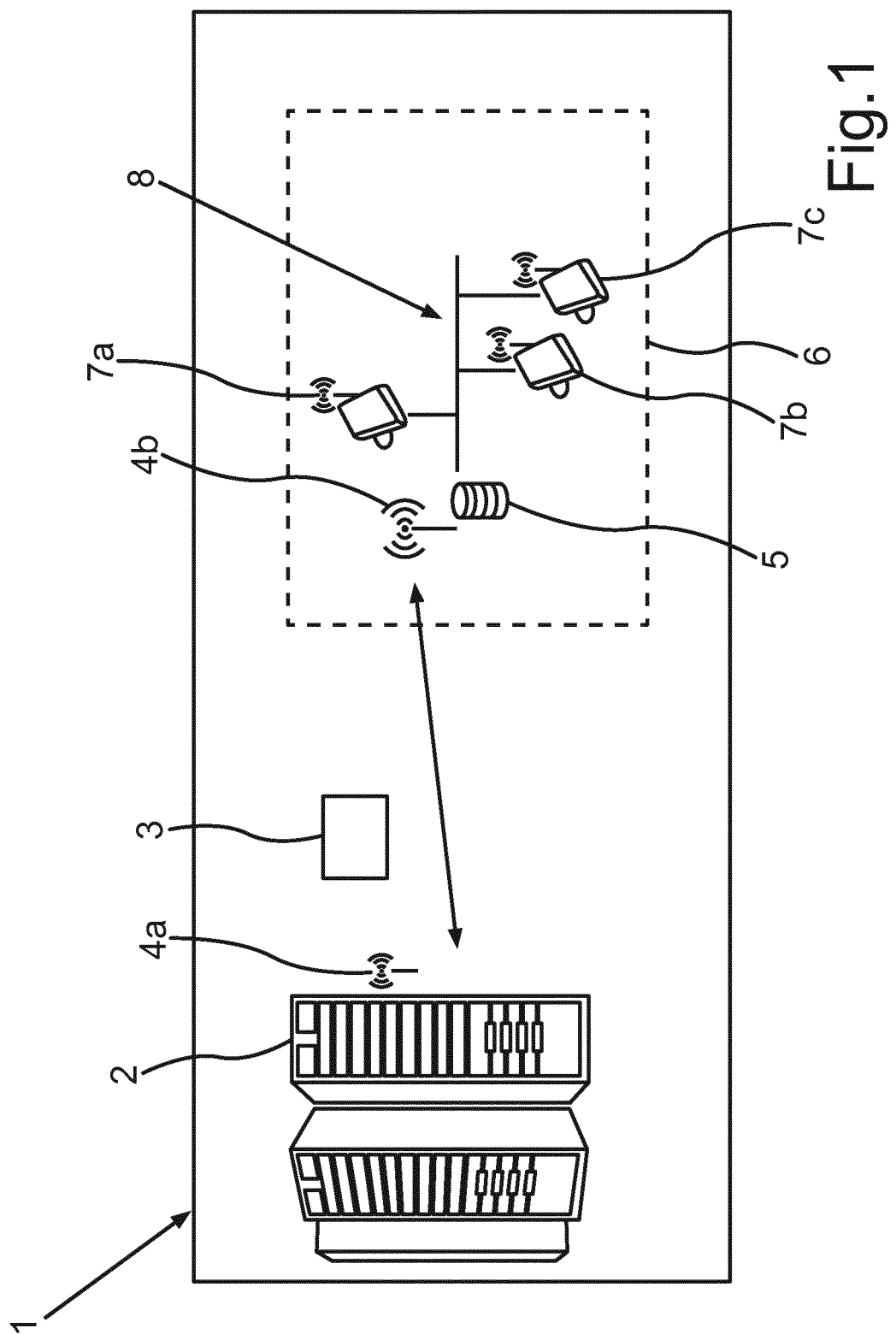

installs the upgrade package on the at least one control device. The at least one transmission device is arranged internally in the motor vehicle.

13 Claims, 2 Drawing Sheets

(51) Int. Cl.
 *B60W 50/06* (2006.01)
 *H04L 67/00* (2022.01)

(58) Field of Classification Search
 USPC .................................................. 717/168–178
 See application file for complete search history.

(56) References Cited

OTHER PUBLICATIONS

Written Opinion dated May 23, 2019 in related/corresponding International Application No. PCT/EP2019/053275.

\* cited by examiner

SYSTEM FOR TRANSMITTING AT LEAST ONE UPGRADE PACKAGE FOR AT LEAST ONE CONTROL DEVICE OF A MOTOR VEHICLE AND METHOD

BACKGROUND AND SUMMARY OF THE INVENTION

The invention relates to a system for transmitting at least one upgrade package for at least one control device of a motor vehicle. The system has a storage device external to the motor vehicle, which is formed for storing the upgrade package. Furthermore, the system has a communication device, which is formed to wirelessly transmit the upgrade package from the storage device external to the motor vehicle to at least one transmission device of the system, wherein the transmission device conducts a transmission process of the upgrade package for the at least one control device and is formed to install the upgrade package on the at least one control device.

Upgrading distributed control device networks constitutes an extended form of a control device upgrade. Here, it is pertinent to localize dependencies, in terms of software, in the network before the update and to organize the installation of the individual software updates by means of the dependencies. To do so, it is necessary to form control device groups to make domains in order to distribute the data load when downloading in the motor vehicle and to be able to accelerate an installation.

DE 10 2016 210 672 A1 discloses a method for the wireless remote upgrade of vehicle software. This method comprises hosting manager software on a server, which is a client server or a central server that the client can access. A piece of manager software is used to select the target vehicle group and to generate a differential upgrade package, which comprises an update manager. The upgrade package is provided by a piece of download manager software to download in each of the one or more target vehicles. The update manager is used in each vehicle to upgrade the one or more target control units.

DE 10 2016 210 674 A1 discloses a method for distributing software updates by vehicle components, which comprise a flash memory, in real time. The method comprises: providing a client server for introducing the software updates; providing a switching server, which communicates with the client server in terms of function; providing a distributed network that comprises a plurality of communication servers, wherein each of the communication servers can communicate with a device in a plurality of corresponding vehicles in terms of function; controlling the individual devices for communicating with one of the plurality of communication servers via a wireless network in order to receive software updates and to adapt to electronic control units (ECUs) in the corresponding vehicle; controlling the individual devices for generating status updates and for communicating the status updates to a communication server via the wireless network; and controlling the individual communication servers for generating a data flow that comprises the data messages of the plurality of corresponding vehicles and for sending the data flow to the switching servers.

In the prior art, the transmission device (download manager), which is formed to conduct a transmission process of the upgrade package for the at least one control device and to install the upgrade package on the at least one control device, is external to the motor vehicle. Using this transmission device, the upgrade package can then be available for a multitude of motor vehicles. This, in particular, has the disadvantage that the focus cannot specifically be on the motor vehicle or on the state of the motor vehicle. This can lead to the download manager downloading the program to a telematics unit of the motor vehicle, whereby it can lead to a strain of the energy store installed in the motor vehicle. This can lead to draining the energy store, whereby, following this, the motor vehicle is no longer roadworthy. Furthermore, the focus does not have to be on vehicle-specific features, for example inside the motor vehicle network structure (domains) in the motor vehicle.

Exemplary embodiments of the present invention are directed to a system and a method by means of which an upgrade package for at least one control device can be downloaded and installed specifically for the vehicle.

One aspect of the invention relates to a system for transmitting at least one upgrade package for at least one control device of a motor vehicle. The system has a storage unit external to the motor vehicle, which is formed to store the upgrade package. Furthermore, the system has a communication device, which is formed to wirelessly transmit the upgrade package from the storage device external to the motor vehicle to at least one transmission device of the system, wherein the transmission device conducts a transmission process of the upgrade package for the at least one control device and is formed to install the upgrade package on the at least one control device.

It is provided that the at least one transmission device is arranged internally with respect to the motor vehicle. Thus, it is made possible that the upgrade package can be correspondingly distributed in the entire motor vehicle network and the installation can be monitored. Thus, entire motor vehicle or control device groups can be specifically and flexibly provided with upgrade packages independently of the vehicle architecture. Here, it is possible, in particular, that the upgrade packages can be carried out in a predetermined sequence according to corresponding priorities. Thus, a motor vehicle specific upgrade for the at least one control devices can be carried out. In particular, with a multitude of control devices, different dependencies of the control devices can be considered one after the other. Furthermore, an accelerated installation process can be achieved by the solution according to the invention.

The at least one control device is, in particular, an electronic control device (Electrical Control Unit—ECU). The control device is formed, in particular, as an electronic computing device. The storage device external to the motor vehicle is, in particular, a server, which can be connected to a network, for example. The transmission device of the system is, in particular, a so-called download manager, which is presently formed internally in relation to the motor vehicle and is formed to conduct or to manage the transmission process of the upgrade package and formed to install the upgrade package on the at least one control device. For example, the motor vehicle can have a communication device, by means of which the motor vehicle can communicate with the communication device of the storage device and the upgrade package can be received. This communication device can, for example, be a so-called telematic control unit (TCU).

Conducting is to be understood, in particular, as controlling the installation and/or taking functional dependencies into consideration. Furthermore, conducting can be seen as "launching" for installing and/or for downloading the update package from the external storage device. Installing is to be understood, in particular, as controlling the transmission of payload, for example, to the control devices. Here, it can be provided that the transmission device conducts and directly carries out the installation in terms of the control devices. Similarly, it is possible that the transmission device conducts the installation by the transmission device letting the control device have control information, and the control device itself downloading and installing the software, which corresponds to the update package, from the external storage device. Thus, the control device itself can be formed as a communication device, yet without having a direct connection in relation to the control data to the external communication device.

In particular, it is provided that, in the storage device external to the motor vehicle, so-called update package campaigns can be defined by using motor vehicle information of the transmission device as guidelines. The rules are used on all motor vehicles, which are saved in the storage device, which adjust to the desired features. Thus, a campaign can be dynamically formed without knowing the exact scope of the motor vehicles in advance. If a rule is relevant to a motor vehicle, then the storage device external to the motor vehicle initially synchronizes control data with the transmission device, in order to declare the manner and scope of the upgrade package to the motor vehicle. Subsequently, the transmission device will download the payload of the upgrade package and install it in the relevant control devices.

Campaigns can thus be controlled via the storage device external to the motor vehicle, for example starting, pausing and stopping. If a campaign is defined and started, it runs until the motor vehicle of the determined scope has been processed. Here, distinction is made between successful and erroneous upgrades. For erroneous upgrades, the upgrade package can be restarted. If a campaign is paused, then the rules are no longer transmitted to the motor vehicles, such that only motor vehicles that have already started the download re-download the upgrade packages. When stopping the campaigns, the storage device external to the motor vehicle is able to interrupt the download via a command and the installation of an upgrade package in the transmission device. Thus, the premature interruption of an upgrade package is also possible if an upgrade package, for example, should contain critical errors and its processing is to be immediately prevented.

Using the synchronization mechanism, the storage device external to the motor vehicle is able to obtain status information via the download and the installation and to monitor it in the campaign management system. Moreover, errors and installation interruptions are reported, which can thus be monitored.

The basis for the data exchange between motor vehicle and the storage device external to the motor vehicle forms a synchronization mechanism, which, via the transmission device, collects software identification features from the upgraded control devices in the motor vehicle. This transmission device regularly synchronizes with the storage device external to the motor vehicle, such that all motor vehicles capable of updating can be buffered. If the transmission device receives a new upgrade order as a result of the synchronization with the storage device external to the vehicle, it therein receives control data communicated for the upgrade package. With the control data, the transmission device is able to upgrade different dependencies on the control device on the relevant control devices in the motor vehicle network taking the different dependencies into consideration.

The dependencies of the software are treated by a comprehensive software interconnection that is interpreted by the transmission device, and the software shares are transmitted to the respective control device using the transmission device. The vehicle identification number, the software version currently available and the software identification number, for example, serve as features.

In particular, it can be provided that software interconnections, consisting of a plurality of software or software shares, are referred to as upgrade packages, though a loose coupling of software and update information is to be understood by this.

The system can be provided, in particular, for an individual motor vehicle as well as for a motor vehicle group. In other words, the upgrade package can be provided for an individual motor vehicle by means of the system, wherein the motor vehicle has the transmission device. Similarly, it is also possible that the system provides the upgrade package for a plurality of motor vehicles, wherein each of the individual motor vehicles then respectively has a transmission device. According to an advantageous embodiment, the at least one transmission device can conduct the transmission process and the installation on the at least one control device independently of a decision criterion. Thus, the function or the network architecture in the motor vehicle can be specifically responded to. As a result, the upgrade package can be installed on the at least one control device in a manner specific to the motor vehicle. It has furthermore proved to be advantageous when the transmission device is formed in such a way that the transmission device conducts the transmission process depending on a functional decision criterion and carries out the installation on the at least one control device. Such a functional decision criterion can be an active current supply for the motor vehicle, for example. In other words, downloading the upgrade package into the transmission device can only be carried out when the ignition is switched on, for example. Thus, an energy store of the motor vehicle can be prevented from discharging, for example.

In a further advantageous embodiment, the transmission device can be formed in such a way that the transmission device conducts the transmission process depending on a decision criterion, which relates to a physical component of the control device, and carries out the installation on the at least one control device. The physical component is, in particular, so-called hardware. Thus, a dependency on the part of the hardware can be provided with the upgrade package when upgrading. A dependency on the part of the hardware is, for example, the connection via a bus system.

Similarly, it is advantageous when the transmission is formed in such a way that the transmission device conducts the transmission process depending on a decision criterion, which relates to a changeable component of the control device, and carries out the installation on the at least one control device. The changeable component of the control device is, in particular, so-called software. Dependencies on the part of the software can be functional in the software of different control devices of a system, yet also dependencies overarching the system, which can be described as a software interconnection. Parameters used together in different software of different control devices are an example of this. Here, it should be noted that pieces of control device software that have such dependencies must be upgraded to match one another. The dependencies of the software are treated by the comprehensive software interconnection, which are interpreted by the transmission device, and the software shares are transmitted to the respective control device by the transmission device. The vehicle identification number, the software version currently available and the software identification number serve as the features, for example.

In a further advantageous embodiment, the motor vehicle can have a plurality of control devices, and the transmission device conducts the transmission process of the upgrade package for the plurality of control devices and can be formed to install the upgrade package on the plurality of control devices. Thus, the upgrade package for different control devices can be distributed via the one transmission device. For example, corresponding campaigns can then be generated by the storage device external to the motor vehicle to control the upgrade package for the different control devices and can be controlled. In particular, it is provided that the plurality of control devices or the network structure can be referred to as domains. In particular, it can be provided that, should the plurality of control devices be detected by the campaigns, the respective control devices and the transmission device are also named in the storage device external to the motor vehicle. The structure of the partial networks, these so-called domains, must here be recognized and taken into consideration. Using clear identification for the respective domains and the global campaigns, it is ensured that the transmission device regularly upgrades its subordinate control devices. As soon as the control data has been synchronized with the transmission device, the transmission device is able to autonomously download the upgrade package from the storage device external to the motor vehicle. If the upgrade package is then downloaded, the transmission device independently begins with the installation in the respective named control devices.

According to a further advantageous embodiment, the motor vehicle can have a plurality of control devices, and the transmission device can conduct the transmission process of a plurality of upgrade packages for the plurality of control devices and can be formed to install the plurality of the upgrade packages on the plurality of control devices and/or the transmission device is formed to be functionally reduced, such that it carries out the transmission process and forwards the upgrade package to the plurality of control devices. Thus, it is made possible that the upgrade packages, for example, can be formed differently, and thus the respective control devices can be upgraded by a one-off download of the plurality of the upgrade packages by means of the transmission device with the respective upgrade packages. Thus, an upgrade of the respective control device can be carried out in a manner that saves resources. It is possible that a functionally reduced transmission device is integrated in the respective control devices, which can conduct or control the download of the payload/control data and the installation on the control devices. The transmission device is then formed, in particular, to only carry out the data transmission from the storage device external to the motor vehicle or from the communication device and, possibly, the download of the upgrade package information from the external storage device. Thus, the at least one upgrade package for the at least one control device can be downloaded and installed in a simple manner.

Similarly, it is advantageous when the motor vehicle has a plurality of transmission devices, wherein a respective transmission device of the plurality of the transmission devices separately conducts the respective transmission process and is formed to install the upgrade package for at least one respective control device allocated to the respective transmission device. In order to reach several control devices in the motor vehicle having the corresponding upgrades, the plurality of the transmission devices can be built in the motor vehicle, which each carry out an individual synchronization with the storage device external to motor vehicle. Thus, on one hand, more control devices of a certain type, for example of entertainment components or those relevant to safety, can be detected in the storage device external to the motor vehicle, since a transmission device has a fixed control device allocation in the motor vehicle and thus a defined communication structure is predetermined. On the other hand, new control device types can thus also be detected in the storage device external to the motor vehicle by means of the connection of a new upgrade domain via its transmission device. Thus, an upgrade of the respective control devices can be carried out in a manner specific to the motor vehicle and specific to the domain in the motor vehicle.

Similarly, it is advantageous when the transmission process of the at least one upgrade package for the plurality of transmission devices and the installation on the at least one control device can be conducted by means of a conducting device internal to the motor vehicle. In other words, should a plurality of transmission devices be built in the motor vehicle, downloading the upgrade package can be controlled by means of a conducting device. Thus, a hierarchy within the motor vehicle network, for example, can be created, such that, for example, components having a higher priority can be upgraded first, while, for example, components having a lower priority can only be upgraded later. The conducting device can then be referred to as a so-called master, which launches an overarching campaign ID, for example, such that the respective transmission devices know whether they are part of the overarching campaign and thus must take part in the negotiation of the upgrade package. For the exchange of the information between the respective transmission devices and the control devices that can be upgraded, a common interface is present in a defined manner, which is transformed on an obligatory basis for all transmission devices.

According to a further advantageous embodiment, a transmission device of the plurality of transmission devices can be selected as the conducting device, which carries out the conducting of the transmission process for the plurality of transmission devices and the installation on the at least one control device. If several upgrade packages are carried out across several domains, then one of the transmission devices, in particular, can define one domain as the leading unit, as a so-called master. The master is chosen for a campaign in the motor vehicle and is responsible for activating the upgrades in the control devices of its domain, but also for controlling the upgrades in the other domains. This is relevant since a control device can introduce new parameters in a distributed application, on which an application in another control device is based. Finally, it is necessary to constantly favor these components. This leads to a hierarchy formation among the upgrades, which the master controls. The master is undertaken in one of the transmission devices of the motor vehicle, in particular by a rigid implementation of the master role. A criterion for such a master choice can be that this transmission device belong to the base equipment of a motor vehicle and not be dependent on extra equipment.

Similarly, it is advantageous when the selection of the transmission device, which conducts a transmission process and the installation on the at least one control device with a plurality of transmission devices, is dependent on the upgrade package to be transmitted. Thus, it is a dynamic selection of the master. This can be dynamically performed via a communication protocol, for example, between the transmission devices for the respective upgrade package campaign. In this case, the master must be chosen as soon as the transmission device is recognized from the upgrade package, such that it is a domain-overarching upgrade. This transmission device must then notify all other transmission devices about this and initiate the selection so that it can control the subsequent download and installation activities of the individual domains. Similarly, here it can also be a criterion for the master selection that this transmission device belong to the base equipment of a motor vehicle and not be dependent on extra equipment. The selection of the update master must be carried out again for each upgrade package. To do so, a common interface must be defined for the exchange of the information between the transmission devices and to the control devices that can be upgraded.

Furthermore, it is advantageous when a piece of upgrade package information can be transmitted from the storage device external to the motor vehicle to the transmission device before the transmission process of the upgrade package and/or a piece of upgrade package information can be transmitted from the storage device to the transmission device before the transmission process of the upgrade package, wherein the upgrade package information contains a piece of information about a further storage location of the upgrade package separate to the storage device, and the transmission device is formed to download the upgrade package from the further storage location. In other words, before the actual upgrade package, a piece of information is provided, by means of which the transmission device can decide when it downloads the upgrade package, for example. This can be dependent, for example, on the functional decision criteria on the part of the hardware or software. Thus, the download can be achieved specifically for the motor vehicle or for the situation of the motor vehicle. Similarly, it is advantageously specified that the upgrade package information contains a piece of information about the further storage location. For example, the further storage location can be a network from which the upgrade package can then be downloaded. Thus, the upgrade package can be stored not only on the storage device external to the motor vehicle but also in the further storage location, for example. Using the storage device external to the motor vehicle, only the information about the further storage location of the upgrade package can be available. The transmission device can then independently download the upgrade package from the further storage location.

According to a further advantageous embodiment, the at least one control device can be formed as a control device of the transmission device or as a control device for a functional unit of the motor vehicle. Should the transmission device, for example, affect the upgrade itself, then the control device of the transmission device must be considered separately from other control devices to be upgraded, since an upgrade of the transmission device can also impede the upgrade of further control devices in the motor vehicle network, in particular in the domains. Thus, an individual upgrade package, for example, can then be provided. Alternatively, the motor vehicle can distribute the data download in the motor vehicle across a defined participant, the so-called domains, in the motor vehicle. The domains can be specifically addressed via rules in the storage device external to the motor vehicle, such that here upgrade packages can be specifically formed for these domains. The transmission device of a domain must subsequently coordinate and priorities the upgrade packages of the control devices allocated to it. The functional unit can be an assistance system, for example, or an entertainment system, which are not part of the transmission device. Along with the mentioned examples, further functional units are possible, which are built in to the motor vehicle. Listing the functional units is thus only exemplary and is not to be seen as exhaustive.

In a further advantageous embodiment, a status information signal can be transmitted to the storage device external to the motor vehicle by means of the transmission device, wherein the status information signal can comprise a status relating to the transmission process and/or a status relating to the installation on the control device. In other words, a piece of information about the installation state or the download state of the upgrade package can be transmitted to the storage device external to the motor vehicle by means of the status information signal. Thus, the status can be checked by means of the storage device external to the motor vehicle.

A further aspect of the invention relates to a method for transmitting at least one upgrade package for at least one control device of the motor vehicle, wherein the at least one upgrade package can be provided by a storage device and transmitted wirelessly from the storage device to at least one transmission device by means of a communication device, by means of which transmission device a transmission process of the at least one upgrade package and the installation of the at least one upgrade package is conducted on the at least one control device. The upgrade package is transmitted to a transmission device external to the motor vehicle.

In particular, it is provided that the transmission process is conducted depending on a functional decision criterion, and the installation on the at least one control device is also carried out depending on the functional decision criterion. Furthermore, it can be provided that the transmission process is conducted by the transmission device depending on a further decision criterion, which relates to a physical component of the storage device, and the installation on the at least one control device is carried out. It is also possible that the transmission process is conducted by the transmission device depending on another further decision criterion, which relates to a changeable component of the control device, and the installation on the at least one control device is also carried out by the transmission device.

It can also be provided that the transmission process of the upgrade package for a plurality of control devices is conducted by the transmission device, and the upgrade package is installed on the plurality of the control devices by means of the transmission device.

Furthermore, it can be provided that the transmission process for a plurality of upgrade packages for a plurality of control devices is conducted by means of the transmission device, and the plurality of upgrade packages on the plurality of control devices is installed by means of the transmission device.

It is also advantageous when respective transmission processes are conducted separately by means of a plurality of transmission devices, and the upgrade package for at least one respective control device allocated to the respective transmission device is installed by means of the plurality of transmission devices.

Furthermore, it can be provided that, with a plurality of transmission devices, the one transmission device is selected as the conducting device by means of a selected transmission device, and conducting the transmission process for the plurality of the transmission devices and the installation on the at least one control device are carried out.

It can also be provided that a piece of upgrade package information is transmitted from the storage device to the transmission device before the transmission process of the upgrade package and/or a piece of upgrade package information is transmitted from the storage device to the transmission device before the transmission process of the upgrade package, wherein the upgrade package information contains a piece of information about a further storage location of the further update package separate to the storage device, and the upgrade package is downloaded from the further storage location by means of the transmission device.

According to a further advantageous embodiment, a status information signal can be transmitted to the storage device by means of the transmission device, wherein the status information signal can comprise a status relating to the transmission process and/or a status relating to the installation on the control device.

Another further aspect of the invention relates to a motor vehicle having a communication device, which is formed to wirelessly transmit an upgrade package from a storage device external to the motor vehicle to at least one transmission device of the motor vehicle external to the motor vehicle, wherein the transmission device conducts, in particular manages, a transmission process of the upgrade package for at least one control device of the motor vehicle and is formed to install the upgrade package on the at least one control device.

Advantageous embodiments of the system can be seen as advantageous embodiments of the method and the motor vehicle. The system and the motor vehicle have objective features in order to make it possible to carry out the method.

Further advantages, features and details of the invention emerge from the below description of preferred exemplary embodiments and by means of the drawings. The features and feature combinations mentioned in the description above and the features and features combinations mentioned below in the description of the figures and/or shown only in the figures are not only to be used in the respectively specified combination, but also in other combinations or on their own, without leaving the scope of the invention.

BRIEF DESCRIPTION OF THE DRAWING FIGURES

Here are shown:

FIG. 1 a schematic view of an exemplary embodiment of a system; and

Figure 2:
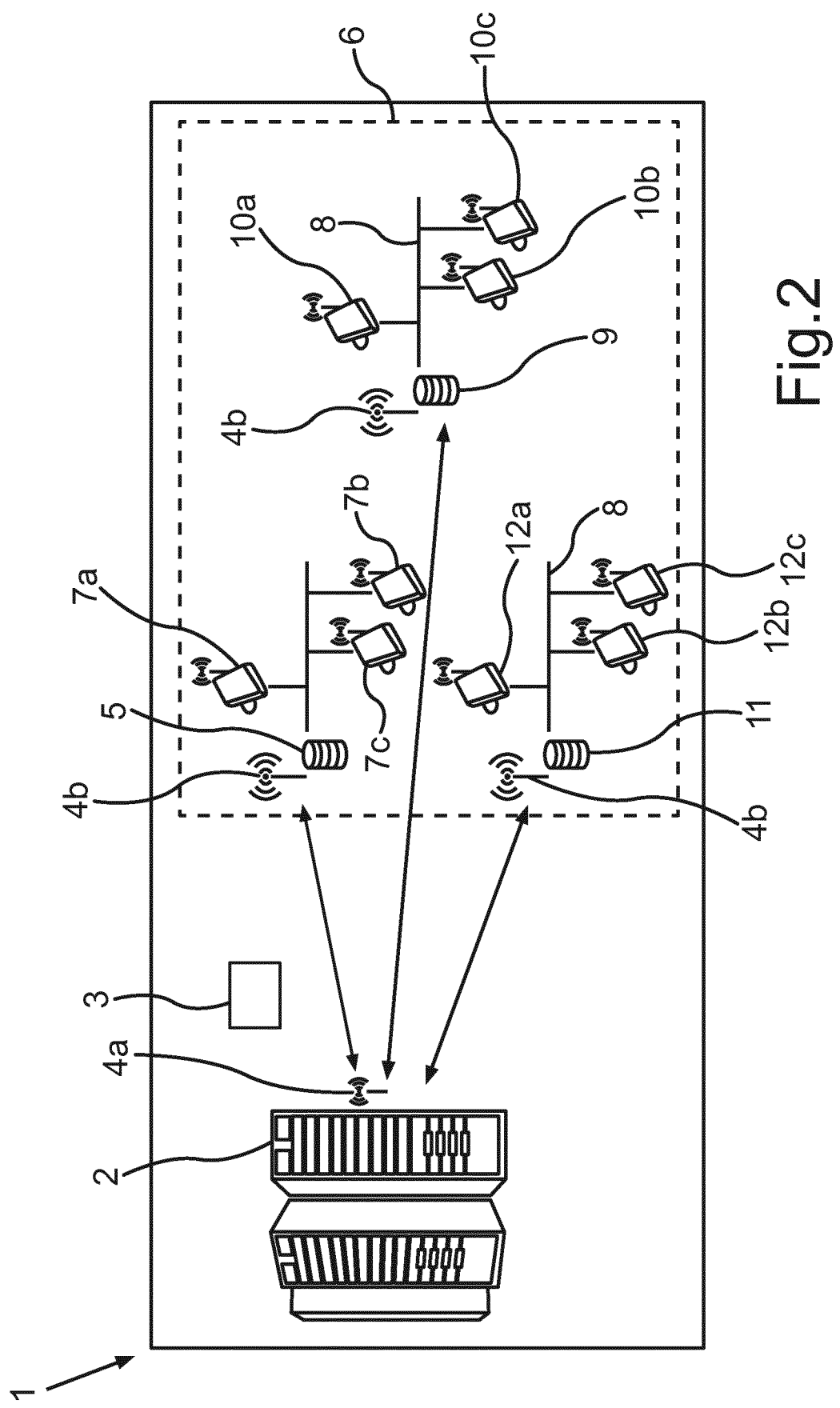

FIG. 2 a further schematic view of a further embodiment of the system.

The same or functionally identical elements are provided with the same reference numerals in the figures.

DETAILED DESCRIPTION

FIG. 1 schematically illustrates an embodiment of a system 1. The system 1 has a storage device 2 external to the motor vehicle. The storage device 2 external to the motor vehicle is formed to store an upgrade package 3. Furthermore, the system 1 has a communication device 4a, 4b, which is formed to wirelessly transmit the upgrade package 3 from the storage device 2 external to the motor vehicle to at least one transmission device 5 of the system 1. In the present example, the communication device 4a, 4b is formed from a first communication device element 4a, which is arranged, in particular, on the storage device 2 external to the motor vehicle, and a second communication device element 4b, which is formed, in particular, in a motor vehicle 6 of the system 1.

The motor vehicle 6 furthermore has at least one control device 7a, 7b, 7c. In the present example, the motor vehicle 6 has three control devices 7a, 7b, 7c in particular.

In the present example, the transmission device 5 and the control devices 7a, 7b, 7c form a motor vehicle network, which can also be referred to as a domain 8.

The transmission device 5 is arranged internally to the motor vehicle. The transmission device 5 is formed to conduct, in particular to manage, a transmission process of the upgrade package 3 for the at least one control device 7a, 7b, 7c and is formed to install the upgrade package 3 on the at least one control device 7a, 7b, 7c.

Thus, in FIG. 1, a system 1 for distributing and controlling distributed control device upgrades, in other words the upgrade package 3, in the domain 8 is shown. There, in particular, hardware and software identification data of the control devices 7a, 7b, 7c that can be upgraded remotely can by collected in the motor vehicle 6 by the transmission device 5 and wirelessly synchronized with the storage device 2 external to the motor vehicle. The storage device 2 external to the motor vehicle is thus able to distribute software for different control devices 7a, 7b, 7c to different motor vehicles 6, to generate campaigns for controlling the upgrade package 3 into the different control devices 7a, 7b, 7c and to control them. Moreover, status information of the transmission device 5 and the upgrade course are monitored there.

It is provided, in particular, that the at least one control device 7a, 7b, 7c is formed as a control device 7a, 7b, 7c of the transmission device 5 or as a control device 7a, 7b, 7c for a functional unit of the motor vehicle 6. For example, a system internal to the motor vehicle, such as an assistance system or an entertainment system, for example, can be referred to as the functional unit. This exemplary design for the functional unit is only to be seen as an example and is in no way conclusive.

It is possible that a functionally reduced transmission device 5 is integrated in the respective control devices 7a, 7b, 7c, which can conduct or control the download of the payload/control data and the installation on the control devices 7a, 7b, 7c. The transmission device 5 is then formed, in particular, to only carry out the data transmission from the storage device 2 external to the motor vehicle or from the communication device 4a and possibly the download of the upgrade package information from the external storage device 2.

Furthermore, a status information signal can be transmitted to the storage device 2 external to the motor vehicle by means of the transmission device 5, wherein the status information signal can comprise a status relating to the transmission process and/or a status relating to the installation on the control device 7a, 7b, 7c.

In particular, the at least one transmission device 5 conducts the transmission process depending on a decision criterion and the installation on the at least one control device 7a, 7b, 7c. Furthermore, it can be particularly provided that the transmission device 5 is formed in such a way that the transmission device 5 conducts the transmission process depending on a functional decision criterion and carries out the installation on the at least one control device 7a, 7b, 7c. Similarly, it can be provided that the transmission device 5 is formed in such a way that the transmission device 5 conducts the transmission process depending on a decision criterion, which relates to a physical component of the control device 7a, 7b, 7c, and carries out the installation on the at least one control device 7a, 7b, 7c. For example, the physical component can be hardware of the control device 7*a*, 7*b*, 7*c*. Similarly, it is possible that the transmission device 5 is formed in such a way that the transmission device 5 conducts the transmission process depending on a decision criterion, which relates to a changeable component of the control device 5, and carries out the installation on the at least one control device 7*a*, 7*b*, 7*c*. The changeable component can be, in particular, so-called software.

Furthermore, the motor vehicle 6 can have a plurality of control devices 7*a*, 7*b*, 7*c*, and the transmission device 5 conducts the transmission process of the upgrade package 3 for the plurality of control devices 7*a*, 7*b*, 7*c* and is formed to install the upgrade package 3 on the plurality of control devices 7*a*, 7*b*, 7*c*. Similarly, it is possible that the motor vehicle 6 has a plurality of control devices 7*a*, 7*b*, 7*c*, and the transmission device 5 conducts the transmission process of a plurality of upgrade packages 3 for the plurality of control devices 7*a*, 7*b*, 7*c* and is formed to install the plurality of the upgrade packages 3 on the plurality of control devices 7*a*, 7*b*, 7*c*.

In the storage device 2 external to the motor vehicle, software update campaigns, in other words upgrade packages 3, using vehicle information of the transmission device 5, can be defined as guidelines. The rules are applied to all motor vehicles 6 in the storage device 2 external to the motor vehicle, which adapt to the desired features. Thus, a campaign can be dynamically formed without knowing the exact scope of the motor vehicles 6 in advance. If a rule relates to a motor vehicle 6, the storage device 2 external to the motor vehicle initially synchronizes control data with the transmission device 5 in order to declare the manner and scope of the upgrade package 3 to the motor vehicle 6. Then the transmission device 5 will download the payloads of the upgrade package 3 and install them in the relevant control devices 7*a*, 7*b*, 7*c*.

Campaigns can be controlled by means of the storage device 2 external to the motor vehicle, for example starting, pausing, and stopping. If a campaign is defined and started, then it runs until all motor vehicles 6 of the determined scope have been processed. Here, distinction is made between successful and erroneous upgrades. For erroneous upgrades, the upgrade package 3 can be restarted. If a campaign is paused, then the rules are no longer transmitted to the motor vehicles 6, such that only motor vehicles 6, which have already started the download, re-download the upgrade package 3. When stopping the campaigns, the storage device 2 external to the motor vehicle is able to interrupt the download via a command and the installation of an upgrade package 3 in the transmission device 5. Thus, the premature interruption of an upgrade of the package campaign is also conceivable if an upgrade package, for example, should contain errors critical to the software update and its processing is to be immediately prevented.

Using the synchronization mechanism, the storage device 2 external to the motor vehicle is able to obtain status information via the download and the installation and to monitor these in the campaign management system. Moreover, errors and installation interruptions are reported, which can thus be monitored.

FIG. 1 shows the basis for the data exchange, which, via the transmission device 5, collects software identification features from the control devices 7*a*, 7*b*, 7*c* to be upgraded in the motor vehicle. The transmission device 5 regularly synchronizes with the storage device 2 external to the motor vehicle, such that all motor vehicles capable of updating can be buffered. If the transmission device 5 receives a new upgrade order as a result of the synchronization with the storage device 2 external to the vehicle, it therein receives control data communicated for the update. With the control data, the transmission device 5 is able to autonomously download upgrade packages 3 from a defined source and to upgrade on the relevant control devices 7*a*, 7*b*, 7*c* in the domain 8, taking functional dependencies into consideration. Such a functional dependency can, for example, be an active current supply for the motor vehicle.

Along with the functional dependencies of an upgrade in relation to the vehicle state, in the case of the control devices 7*a*, 7*b*, 7*c*, there are dependencies on the part of the hardware and software. For example, a dependency on the part of the hardware can be control devices 7*a*, 7*b*, 7*c* of a system that are functionally different in the software, but also system-overarching dependencies, which are described as a software interconnection. Parameters used together in different software of different control devices 7*a*, 7*b*, 7*c* are to be mentioned, for example. Here, it is to be noted that pieces of control device software that have such dependencies must be upgraded to match one another. The dependencies of the software are treated by a comprehensive software interconnection, which is interpreted by the transmission device 5, and the software parts are transmitted to the respective control device 7*a*, 7*b*, 7*c* by the transmission device 5. The vehicle identification number, the software version currently available and the software identification number serve as features, for example.

If several control devices 7*a*, 7*b*, 7*c* are to be detected by a campaign in the motor vehicle 6, then all control devices 7*a*, 7*b*, 7*c* and the corresponding transmission device 5 must be named in the storage device 2 external to the motor vehicle. The structure of the domain 8 must here be recognized and taken into consideration. By clear identification for the respective domain 8 and the global campaign, it is ensured that the transmission device 5 punctually upgrades its subordinate control devices 7*a*, 7*b*, 7*c*. As soon as the control data has been synchronized with the transmission device 5, this is able to independently download the upgrade package 3 from a specific source, the address of which has been transferred by means of a piece of upgrade package information, for example. If the upgrade package 3 is downloaded, the transmission device 5 independently begins the installation.

If the control device 7*a*, 7*b*, 7*c* is a control device 7*a*, 7*b*, 7*c* of the transmission device 5, then this must be taken into consideration separately from other control devices 7*a*, 7*b*, 7*c* to be upgraded, since an upgrade package 3 for the transmission device 5 can also impede the upgrade of further control devices 7*a*, 7*b*, 7*c* in the domain 8. This can be ensured via an individual upgrade package 3.

For example, should an upgrade be carried out within a domain 8, then the motor vehicle 6 can distribute the data download in the motor vehicle 6 via the domains 8 in the motor vehicle 6, since, because of the amount of data, it is not possible to efficiently distribute large applications via a path to different control devices 7*a*, 7*b*, 7*c* in the motor vehicle 6. The domains 8 can be specifically addressed via rules in the storage device 2 external to the motor vehicle, such that the upgrade packages 3 can be specifically formed here for these domains 8. The transmission device 5 subsequently manages the upgrade packages 3 of the control devices 7*a*, 7*b*, 7*c* allocated to them and installs these.

FIG. 2 illustrates a schematic view of a further embodiment of the system 1. FIG. 2 describes the system 1 for distributing and controlling distributed upgrade packages 3 in a plurality of domains 8 using several transmission devices 5, 9, 11. Here, a respective transmission device 5, 9, 11 is able to update its allocated control devices 7*a*, 7*b*, 7*c*, 10a, 10b, 10c, 12a, 12b, 12c and to thus form a so-called update domain. Each transmission device 5, 9, 11 is synchronized wirelessly and separately with the storage device 2 external to the motor vehicle via respective communication device elements 4b. Thus, by means of a synchronization of the transmission devices 5, 9, 11 internal to the vehicle, upgrade packages 3 overarching the domains can be achieved, the course of which upgrade packages is adjusted by the transmission devices 5, 9, 11. Similarly, it is possible that each of the transmission devices 5, 9, 11 does not have a communication device element 4b assigned to this, but rather a common communication device element 4b is formed for the plurality of transmission devices 5, such that the transmission devices 5, 9, 11 use the one communication device element 4b. The transmission devices 5, 9, 11 then each communicate with the communication device element 4b, for example as a head unit, via a bus, for example, wherein the communication device element 4b in turn then communicates with the external storage device 2 via a mobile network. The storage device 2 external to the motor vehicle is thus able to distribute software for different control devices 7a, 7b, 7c, 10a, 10b, 10c, 12a, 12b, 12c in different domains to different motor vehicles 6, to generate campaigns to control the upgrade packages 3 in the different control devices 7a, 7b, 7c, 10a, 10b, 10c, 12a, 12b, 12c and to control them, as well as to monitor their status.

Furthermore, it can be seen in FIG. 2 that the motor vehicle 6 has a plurality of transmission devices 5, 9, 11, wherein a respective transmission device 5, 9, 11 of the plurality of transmission devices 5, 9, 11 can separately conduct the respective transmission process and is formed to install the upgrade package 3 for at least one respective control device 7a, 7b, 7c, 10a, 10b, 10c, 12a, 12b, 12c allocated to the respective transmission devices 5, 9, 11. Furthermore, the transmission process of the at least one upgrade package 3 can be conducted for the plurality of transmission devices 5, 9, 11 and the installation on the at least one control device 7a, 7b, 7c, 10a, 10b, 10c, 12a, 12b, 12c by means of a conducting device internal to the motor vehicle. In particular, a transmission device 5, 9, 11 of the plurality of the transmission devices 5, 9, 11 can be selected as the conducting device, which carries out the conducting of the transmission process for the plurality of transmission devices 5, 9, 11 and the installation on the at least one control device 7a, 7b, 7c, 10a, 10b, 10c, 12a, 12b, 12c.

Furthermore, the selection of the transmission device 5, 9, 11, which conducts the transmission process and the installation on the at least one control device 7a, 7b, 7c, 10a, 10b, 10c, 12a, 12b, 12c, can be dependent on the upgrade package 3 to be transmitted.

Furthermore, a piece of upgrade package information can be transmitted from the storage device 3 external to the motor vehicle to the transmission device 5, 9, 11 before the transmission process of the upgrade package 3, and/or a piece of upgrade package information can be transmitted from the storage device 2 external to the vehicle to the transmission device 5, 9, 11 before the transmission process of the upgrade package 3, wherein the upgrade package information contains a piece of information about a further storage location of the upgrade package 3, separate to the storage device 2 external to the motor vehicle, and the transmission device 5, 9, 11 is formed to download the upgrade package 3 from the further storage location.

As FIG. 2 shows, several control devices 7a, 7b, 7c, 10a, 10b, 10c, 12a, 12b, 12c are installed in the motor vehicle 6 in particular, which can each be synchronized via a respective transmission device 5, 9, 11. Thus, more control devices 7a, 7b, 7c, 10a, 10b, 10c, 12a, 12b, 12c of a certain type, such as entertainment components or those relevant to safety, for example, can be detected in the storage device 2 external to the motor vehicle, for example, since a transmission device 5, 9, 11 has a fixed control device allocation in the motor vehicle 6, and thus a defined communication structure is predetermined. On the other hand, new control device types can thus also be detected in the storage device 2 external to the motor vehicle using the connection to new domains 8 via their transmission device 5, 9, 11.

It can be provided that the upgrades are guided over several domains 8 and are achieved by means of several upgrade packages 3, which are downloaded from a respective transmission device 5, 9, 11 of the respective domain 8. The transmission devices 5, 9, 11 negotiate the installation sequence of the upgrade package 3 via a control mechanism, wherein, inside the domain, the respective transmission device 5, 9, 11 gets allocated to the control device software via the installation sequence by means of a local priority of the storage device 2 external to the motor vehicle.

If upgrades are carried out across several domains 8, the transmission device 5, 9, 11 of a domain 8 must be defined as the conducting unit, as a so-called master. This is because the master is chosen in the motor vehicle 6 for a campaign and is responsible for activating the upgrades in the control devices 7a, 7b, 7c, 10a, 10b, 10c, 12a, 12b, 12c of its domain 8, but also for controlling the upgrades in other domains 8. This is relevant since a control device 7a, 7b, 7c, 10a, 10b, 10c, 12a, 12b, 12c can introduce new parameters in a distributed application, on which an application in another control device 7a, 7b, 7c, 10a, 10b, 10c, 12a, 12b, 12c is based. Consequently, it is necessary to always favor these components. This leads to a hierarchy formation among the upgrades, which controls the master. The selection of the master can be undertaken dynamically for an upgrade package 3 by a rigid implementation of the master role into one of the transmission devices 5, 9, 11 of a motor vehicle 6 or via a communication protocol between the transmission devices 5, 9, 11. In the case of the dynamic selection, the master must be chosen as soon as a transmission device 5, 9, 11 recognizes from the upgrade package 3 that it is a domain-overarching upgrade package 3. This transmission device 5, 9, 11 must then inform all other transmission devices 5, 9, 11 about this and initiate the choice, so that it can control the subsequent download and installation activities of the individual domains 8. A criterion for the master selection can be that this transmission device 5, 9, 11 belong to the base equipment of the motor vehicle 6 and not be dependent on extra equipment. Along with the identification as the update master, it is necessary to introduce an overarching campaign ID, such that other transmission devices 5, 9, 11 know whether they are part of the overarching campaign and thus must take part in the negotiation of the update master. The selection of the update master must be carried out again for each update, in other words for each upgrade package 3, or fixedly configured. A common interface has been defined for the exchange of the information between the transmission devices 5, 9, 11 to the control devices 7a, 7b, 7c, 10a, 10b, 10c, 12a, 12b, 12c that can be upgraded, the obligations of which must be implemented in all transmission devices 5, 9, 11.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A system for transmitting at least one upgrade package for at least one control device of a motor vehicle, the system comprising:
    a storage device external to the motor vehicle, wherein the storage device stores the at least one upgrade package;
    a first and second domain in the vehicle, wherein the first domain includes a first download manager and a first control device, and the second domain includes a second download manager and a second control device, wherein one of the first and second download managers is a conducting device; and
    a communication device that wirelessly transmits the at least one upgrade package from the storage device external to the motor vehicle to the conducting device, wherein the conducting device conducts a transmission process of the at least one upgrade package for the both the first and second control devices and installs the at least one upgrade package on the first and second control devices according to software dependencies of the at least one upgrade package.

2. The system of claim 1, wherein the conducting device conducts the transmission process and the installation on the first and second control devices depending on a decision criterion.

3. The system of claim 2, wherein the decision criterion relates to a physical component of one of the first and second control devices.

4. The system of claim 2, the decision criterion relates to a changeable component of one of the first and second control devices.

5. The system of claim 1, wherein the first control device comprises a plurality of first control devices, and conducting device conducts the transmission process of the upgrade package for the plurality of first control devices and to install the upgrade package on the plurality of first control devices.

6. The system of claim 1, wherein the first control device comprises a plurality of first control devices, the at least one upgrade package comprises a plurality of upgrade packages, and the conducting device conducts the transmission process of the plurality of upgrade packages for the plurality of first control devices and installs the plurality of the upgrade packages on the plurality of first control devices.

7. The system of claim 1, wherein a selection of one of the first and second download managers as the conducting device is dependent on the at least one upgrade package to be transmitted.

8. The system of claim 1, wherein a piece of upgrade package information is transmitted from the storage device external to the motor vehicle to the conducting device before the transmission process of the upgrade package.

9. The system of claim 1, wherein a piece of upgrade package information is be transmitted from the storage device external to the motor vehicle to the conducting device before the transmission process of the at least one upgrade package, wherein the at least one upgrade package information contains a piece of information about a further storage location of the at least one upgrade package, the further storage location being separate from the storage device external to the motor vehicle, and the conducting device downloads the upgrade package from the further storage location.

10. The system of claim 1, wherein at least one of the first and second control devices is a control device of one of the first and second download managers or is a control device for a functional unit of the motor vehicle.

11. The system of claim 1, wherein a status information signal is transmitted to the storage device external to the motor vehicle by the conducting device, wherein the status information signal comprises a status relating to the transmission process.

12. The system of claim 1, wherein a status information signal is transmitted to the storage device external to the motor vehicle by the conducting device, wherein the status information signal comprises a status relating to the installation on the first and second control devices.

13. A method for transmitting at least one upgrade package for at least one control device of a motor vehicle, the method comprising:
    storing, in a storage device external to the motor vehicle, the at least one upgrade package;
    wirelessly transmitting, by a communication device, the at least one upgrade package from the storage device external to the motor vehicle to a conducting device of the motor vehicle, wherein the motor vehicle includes first and second domains, the first domain including a first download manager and a first control device, and the second domain including a second download manager and a second control device, wherein one of the first and second download managers is the conducting device, wherein the conducting device conducts a transmission process of the at least one upgrade package for the first and second control devices and installs the at least one upgrade package on the first and second control devices according to software dependencies of the at least one upgrade package.

* * * * *